United States Patent [19]

Jennings

[11] Patent Number: 4,668,658

[45] Date of Patent: May 26, 1987

[54] IRON CATALYST AND METHOD OF PRODUCING IT

[75] Inventor: James R. Jennings, Cleveland, England

[73] Assignee: Imperial Chemical Industries PLC, London, England

[21] Appl. No.: 758,414

[22] Filed: Jul. 24, 1985

[30] Foreign Application Priority Data

Aug. 3, 1984 [GB] United Kingdom ................ 8419851

[51] Int. Cl.$^4$ .......................... B01J 21/04; B01J 23/74
[52] U.S. Cl. .................................... 502/336; 502/338; 423/362
[58] Field of Search ................ 502/336, 338; 423/362

[56] References Cited

U.S. PATENT DOCUMENTS

| | | | |
|---|---|---|---|
| 3,644,216 | 2/1972 | Egalon et al. | 252/455 R |
| 4,119,570 | 10/1978 | Kroenke et al. | 252/466 J |
| 4,375,569 | 3/1983 | Kroenke et al. | 570/224 |

FOREIGN PATENT DOCUMENTS 2306183  3/1976  France .

OTHER PUBLICATIONS

Rubinshtein et al., "Extensive Study of the Iron Catalysts of Ammonia Synthesis", Kinetika i Kataliz, 1965, 6(2), pp. 285–293.

*Primary Examiner*—W. J. Shine
*Attorney, Agent, or Firm*—Cushman, Darby & Cushman

[57] ABSTRACT

A pelleted iron oxide catalyst precursor wherein the iron oxide has an O/Fe atomic ratio in the range 1.2 to 1.4, a high surface area and a density of at least 2.6 g.cm$^{-3}$. The precursor may be made by de-oxidizing, by heating in the presence of a steam/hydrogen mixture, an iron oxide composition made by precipitation and calcination, followed by pelleting after-de-oxidation.

13 Claims, No Drawings

IRON CATALYST AND METHOD OF PRODUCING IT

This invention relates to catalyst production and in particular to an oxidic precursor of an iron catalyst and a method for producing it.

Iron catalysts used for example in ammonia synthesis or nitrile hydrogenation are commonly made by steps including melting iron oxide possibly containing small quantities of other oxides, solidifying the melt and crushing the solid to the required particle size. It has been proposed, for example by Akimov et al. (Kinetika i Kataliz, 1965, 6(2), 285–293, published in translation by Consultants Bureau, New York, USA), to make an ammonia synthesis catalyst by co-precipitation of ferric hydroxide and aluminium hydroxide and shaping this product by compression. However, such catalysts have not displaced catalysts produced by the fusion route.

We have now realised that such catalysts have been unsatisfactory because of (inter alia) their low density, that attempts to increase their density by sintering fail because at the required temperatures a change in crystal struction unfavourable to the promoter effect of alumina occurs, and that part at least of the required density increase can be obtained by control of the state of oxidation of iron at the shaping stage.

According to the invention a precursor convertible to a metallic iron catalyst by reduction comprises pelleted iron oxide having an O/Fe atomic ratio in the range 1.2 to 1.4, having a crystal structure, eg that of magnetite, with which alumina is capable of isomorphism, a BET surface area of at least 10 $m^2g^{-1}$ and a pellet density of at least 2.6 $g.cm^3$.

The precursor is characterisable further by its pore volume distribution, such that the catalyst formed from it by reduction has high activity and mechanical strength.

The iron oxide content of the precursor (after ignition at 600° C.) is preferably over 70% w/w expressed as $Fe_2O_3$. For an ammonia synthesis catalyst the iron oxide content is typically in the range 80–98% w/w and the balance preferably includes alumina, typically 1–10% w/w, and may include other non-reducible oxides for example of one or more of beryllium, magnesium, silicon, calcium, rare earths and actinides. Such a precursor may include an oxide of cobalt, in a concentration typically in the range 0.1 to 15% by metal atoms in substitution for iron atoms. The precursor may include at least one alkali metal compound, for example a potassium compound, at a concentration typically up to 2% w/w calculated at equivalent $K_2O$ but greater than this if relatively high contents of acidic or amphoteric oxides are present. For a nitrile hydrogenation catalyst the iron oxide content is typically at least 95% w/w, the balance being for example alumina.

The BET surface area is typically in the range 10–200, especially 15–70, $m^2g^{-1}$. The density is typically in the range 2.8 to 4.5 $g\ cm^{-3}$.

The form of the precursor is typically compressed cylinders or rings, in which event it contains a pelleting lubricant such as graphite or a metal soap. Its form can, however, be for example extrudates or dish-granulated approximate spheres. By the term pellet we also include compacts made for example by roll compaction.

The invention includes methods of making the precursor, in particular involving the steps (a) de-oxidising an iron oxide composition of a higher oxidation level i.e. a composition in which the iron oxide has an O/Fe atomic ratio outside the range 1.2 to 1.4, until the iron oxide has an O/Fe atomic ratio within the range 1.2 to 1.4. Conveniently this can be done by contacting such a composition or a corresponding hydrated oxide with a reducing agent of contrlled strength, for example a gaseous mixture of reducing and mildly oxidising compounds or heating it in an atmosphere of low enough oxygen content, for example in vacuo. If desired it can be done in the slurry phase by means of a gaseous or dissolved reducing agent; or (b) forming a hydrated iron oxide composition by precipitation from a solution containing ferric and ferrous iron in a proportion corresponding to the desired O/Fe atomic ratio, then calcining that composition in a neutral or oxidatively balanced atmosphere to give the oxide. For this precipitation again a dissolved reducing agent is desirable and the atmosphere in contact with the solutions should be neutral or balanced.

The gaseous de-oxidation in (a) or the calcination in (b) are conveniently applied to the material in agglomerated form but, since the agglomerates have to withstand the de-oxidation and handling but no extended process use, they need not have the high crush strength normally specified for catalysts. Alternatively the material undergoing de-oxidation or calcination can be a fluidised bed or a powder tumbled in rotating drum.

If method (a) is used, the iron oxide composition is preferably a hydrated ferric oxide formed by way of precipitation from a soluble ferric salt by reaction with an alkaline precipitant such as a hydroxide or carbonate of an alkali metal or ammonia. The hydrated ferric oxide containing composition may be calcined, eg at temperatures within the range 200°–500° C., prior to the de-oxidation step, except where, as mentioned below, the hydrated ferric oxide is in the goethite form. The precipitation conditions are preferably such as to produce the hydrated oxide in gel form, especially if hydrated alumina is co-precipitated with the iron oxide, since then the alumina can also be in gel form and crystallographic incompatibility can be avoided.

The precipitation, or precipitations, is preferably effected at a pH of above 6.5 and at a temperature of 15°–65° C. In a particularly preferred mode of operation the precipitation of at least the iron is effected by continuously feeding the aqueous iron solution and the precipitant to a junction from which the resultant precipitant is continusously removed.

Instead of precipitating the iron as a hydrated oxide in gel form, the hydrated oxide may be in the lepidocrocite (gamma FeOOH) form, in which event any alumina can be in the isomorphous böhmite ("gamma AlOOH" or "alpha alumina monohydrate") form. If desired, the crystal shape of the lepidrocrocite can be deliberately controlled, for example in acicular shape, possibly using a shape-stabilising additive. Another possibility is to produce hydrated ferric oxide in the goethite (alpha FeOOH) form and to co-precipitate hydrated alumina in the diaspore ("beta alumina monohydrate") form as a minor component of mixed crystals. In producing the agglomerated iron oxide of O/Fe atomic ratio in the range 1.2 to 1.4 from goethite it is preferred to reduce before complete or indeed any substantial dehydration, for example in the slurry phase.

The starting ferric oxide has a surface area preferably over 100 $m^2g^{-1}$, for example in the range 200–400 $m^2g^{-1}$.

The step of de-oxidation to iron oxide in the specified o/Fe atomic range is carried out preferably by means of a mixture comprising 10–90, especially 20–80, volumes percent of oxidant gas, the balance being reductant gas, in addition to any nonreactant gases. Conveniently the oxidant gas is steam and the reductant gas is hydrogen. Steam is especially desirable when dehydration of hydrated iron oxide to an unwanted ferric oxide phase is to be avoided. Steam+hydrogen is preferred if the starting oxide contains compounds of sulphur or chlorine. Other mixtures include carbon monoxide+carbon dioxide and also chemically reactive mixtures such as carbon monoxide+steam, methanol+steam and carbon dioxide+hydrogen, which require precautions to cope with exotherms or endotherms. Other organic compounds, possibly mixed with hydrogen and/or steam, can be used.

Using such a gas mixture the temperature of de-oxidation is typically in the range 250°–500° C. Higher temperatures within this range are desirable if the starting iron oxide is converted only slowly to the magnetite structure.

If de-oxidation in an atmosphere of low oxygen content is used, for example in vacuo or in a current of nitrogen or noble gas is used, the temperature is typically in the range 200°–300° C.

If the oxide having the specified O/Fe ratio is made by dehydration of a hydrated oxide already in that oxidation step, it may be subjected to a steam+hydrogen mixture to remove any compounds of sulphur or chlorine introduced during its preparation.

After the de-oxidation or calcination the oxide having the specified O/Fe ratio is normally pelleted into pieces of the specified density. These pieces typically pass a 20 mm, but are held on a 2 mm, sieve. Conveniently they are cylinders or rings formed by dry compression with a lubricant but can in favourable conditions be formed by moulding, extrusion or dish granulation. It is possible in principle to avoid the pelleting step by arranging for the agglomerates subjected to de-oxidation or calcination to have or to shrink to the specified pellet density. The pellets can be heated to cause sintering and thus increase their density and/or mechanical strength. Alternatively after de-oxidation the agglomerates may be compacted to the desired pellet form.

If the precursor is to contain an alkali metal compound this is added preferably before the de-oxidation but it can if desired be added later or indeed after the reduction step described below or at more than one stage.

Reduction of the precursor to active catalyst is conveniently effected by hydrogen at a temperature in the range 300°–500° C. If the catalyst is to be used for ammonia synthesis, the reducing gas used is usually ammonia synthesis gas and is passed over the precursor in the reactor in which synthesis is to take place. Precautions are taken to avoid back-diffusion of water vapour into contact with iron formed by the reduction and to prevent over-heating once ammonia synthesis has begun. Alternatively the precursor can be reduced by nitrogen-free hydrogen. In either event the gas pressure is suitably in the range 1–300, for example 20–120 bar abs. In an alternative procedure the precursor is reduced outside the synthesis reactor and passivated by cool dilute oxygen to give "pre-reduced" catalyst, which thereafter is charged to the synthesis reactor and therein fully reduced. If the catalyst is to be used for nitrile hydrogenation, the precursor is usually reduced with hydrogen, preferably containing a few percent of ammonia.

The resulting catalyst has an iron surface area significantly greater than that of a fused catalyst.

The invention provides a process of ammonia synthesis over the catalyst and in these preferred conditions:

| | |
|---|---|
| Temperature °C. | 300–500, especially 35–430. |
| Pressure, bar abs | 20–250, especially 40–120. |
| Gas mixture | $H_2/N_2$ up to 3.1, especially 2.5 to 3.0 or (as in our USP 4383982) 1.5 to 2.3. |
| Catalyst composition includes promoters as hereinbefore specified. | |

The invention provides also a process of hydrogenating adiponitrile to hexamethylene diamine over the catalyst and in these preferred conditions.

| | |
|---|---|
| Temperature °C. | 80–200 |
| Pressure bar abs. | 200–400 |
| State of matter | preferably supercritical |
| Gas mixture | hydrogen + 2–10 parts by weight of ammonia per part of adiponitrile. |

EXAMPLE 1

Catalyst Precursor Preparation

An aqueous solution of 1M ferric nitrate and 0.05M aluminium nitrate was mixed at a flowing junction with aqueous ammonia with flow rates controlled so as to keep the pH of the resulting slurry at at least 10. The precipitated mixed hydroxides were collected on a filter, washed until nitrate-free and dried at 120° C. The dried product was ground to a fine powder, wetted with aqueous potassium carbonate solution so as to add about 0.5% of its dry weight of $K_2O$, then dried again, mixed with about 1% of its weight of graphite and compressed into cylinders 8.8 mm in diameter and 10 mm high having a pellet density of 2.1 g cm$^{-3}$. Its surface area was 270 m$^2$g$^{-1}$.

A sample of these pellets (A) was set aside as a control.

The remainder of these pellets was charged to a laboratory test reactor normally used for the carbon monoxide/steam shift reaction and deoxidised in the following conditions:

| | | |
|---|---|---|
| Pressure | 1 bar abs. | |
| Temperature | 300° C. | |
| Gas mixture % $v/v$ | $H_2$ | 40 |
| | CO | 5 |
| | $CO_2$ | 5 |
| | steam | 50 |

The balance of oxidising gases ($H_2O$, $CO_2$) and reducing gases is such that the starting ferric oxide $Fe_2O_3$ is de-oxidised to $Fe_3O_4$ but not further. The reactor was cooled in a current of nitrogen, then discharged. The product was now stable to air provided it was kept cool. It was ground to a fine powder, mixed with 1.0% w/w of graphite and compressed into cylinders as before. Using the same applied pressure in the pelleting machine the pellet density was 3.0 g cm$^{-3}$, which is about 40% higher than before de-oxidation. The surface area of the product was 23.4 m$^2$g$^{-1}$ and its pore volume was 0.2 $cm^3g^{-1}$. These pellets (B) are a catalyst precursor according to the invention.

Catalyst Test in Ammonia Synthesis

Samples of pellets A and B were crushed to the sieve range 0.6 to 1.0 mm and charged each to a laboratory reactor having a catalyst bed 3.2 mm in diameter and 32 mm long. Each charge was activated by reduction in a 3:1 hydrogen:nitrogen mixture at 50 bar abs. pressure, raising the temperature to 475° C. over 12 h and holding that temperature for 3 h. Then each charge was operated in ammonia synthesis at that pressure at 450° C. and at a space velocity of 40000 $cm^3$ of gas per g of catalyst per hour. The percentage conversions to ammonia were as follows:

A: 11.45
B: 12.05.

From percentage conversions measured at other space velocities the "initial" rate constant, per unit catalyst precursor weight, is calculated using standard kinetics.

To assess the rate of decline of activity an accelerated aging procedure is then adopted by increasing the temperature to 550° C. and maintaining that temperature for 6 hours. The temperature is then reduced to 450° C. and the conversion at various flow rates measured. The "final" rate constant, per unit catalyst precursor weight, is then calculated.

In the following table the initial and final relative activities are the ratio of the initial and final rate constants, respectively, to the initial rate constant of a standard fused catalyst.

| Sample | Composition* (wt %) | | | Relative Activity | | Pellet Density (g·$cm^{-3}$) |
|---|---|---|---|---|---|---|
| | $Fe_2O_3$ | $Al_2O_3$ | $K_2O$ | Initial | Final | |
| A | 97 | 2.3 | 0.4 | 1.47 | 1.47 | 2.1 |
| B | 97 | 2.3 | 0.5 | 1.74 | 1.59 | 3.0 |

*after ignition of precursor at 600° C.

EXAMPLE 2

An oxidic mixture was prepared by precipitation by adding an aqueous ammonia solution at 20° C. to an aqueous solution containing 0.66M ferric nitrate, 0.037M cobalt nitrate, and 0.031M aluminium nitrate in the requisite proportions to give a slurry of pH 11.

The precipitate was collected on a filter, washed until nitrate free, and dried at 120° C. The precipitate was calcined for 6 hours, ground, wetted with potassium carbonate solution to give the requisite potassium content and then dried.

The product was then pelleted as in Example 1 to give pellets (sample C) of density 2.1 g.$cm^{-3}$. Some of the pellets were then de-oxidised, ground and repelleted as in Example 1 to give pellets (sample D) of density 3.0 g.$cm^{-3}$.

In a further experiment, a sample of the ground, calcined, precipitate was pelleted, de-oxidised, ground, and repelleted as above to give pellets (sample E) of density 2.9 g.$cm^{-3}$. In this case the impregnation with potassium carbonate was effected on the ground, de-oxidised, material prior to repelleting. The samples C, D, and E were reduced and tested as in Example 1.

The results were as follows:

| Sample | Composition* (wt %) | | | Relative Iron Surface area+ | Relative activity | | Pellet Density (g·$cm^{-3}$) |
|---|---|---|---|---|---|---|---|
| | $Fe_2O_3$ | $Al_2O_3$ | CoO/ $K_2O$ | | Initial | Final | |
| C | 94.4 | 2.8 | 1.2 0.7 | 2.1 | 1.79 | 1.79 | 2.1 |
| D | 94.7 | 2.8 | 1.2 1.0 | 1.7 | 1.79 | 1.69 | 3.0 |
| E | 94.7 | 2.8 | 1.2 1.0 | 1.5 | 1.74 | 1.69 | 2.9 |

*after ignition of precursor at 600° C.
+of reduced catalyst, relative to fused catalyst.

EXAMPLE 3

22.4 ml of 1M magnesium nitrate was added to 44.5 ml of 1M sodium aluminate together with sufficient nitric acid to maintain the pH at 7.0±0.5, thereby producing a slurry of "magnesium aluminate". 1800 ml of 0.67M ferric nitrate was added to 1800 ml of aqueous ammonia (specific gravity 0.88) to produce a slurry of ferric hydroxide precipitate at pH 12.

This slurry was added to the "magnesium aluminate" slurry and mixed until homogeneous. The product was filtered, washed, dried, calcined at 250° C. for 6 hours, ground wetted with potassium carbonate solution, dried and pelleted as in Example 2 to give pellets (sample F) of density 2.4 g.$cm^{-3}$. A sample of the pellets were de-oxidised, ground, and repelleted as in Example 1 to give pellets (sample G) of density 3.5 g.$cm^{-3}$.

The composition of the precursors, after ignition at 600° C., and the activities of the catalyst obtained by reduction of pellets F and testing as in Example 1 were as follows:

| Composition (wt %) | | | | Relative Activity | |
|---|---|---|---|---|---|
| $Fe_2O_3$ | $Al_2O_3$ | MgO | $K_2O$ | Initial | Final |
| 95.5 | 2.0 | 0.9 | 0.8 | 2.06 | 1.79 |

It is expected that the activities of pellets G will be similar to those of pellets F: however because of their much increased density, the activity per unit catalyst bed volume will therefore be significantly improved.

It is seen that the catalysts of the invention have a high activity compared to the standard fused catalyst. This increased activity enables lower ammonia converter temperatures to be employed thus enabling the converter pressure to be reduced, compared to conventional conditions, with consequent savings in compression costs.

I claim:

1. A precursor convertible to a metallic iron catalyst by reduction comprising pelleted iron oxide having an O/Fe atomic ratio in the range 1.2 to 1.4, having a crystal structure with which alumina is capable of isomorphism, a BET surface area of at least 10 $m^2g^{-1}$, and a pellet density of at least 2.6 g.$cm^{-3}$.

2. A precursor according to claim 1 containing iron oxide and alumina in such proportions that, after ignition at 600° C., the ignited composition contains 80–98% by weight of iron oxide, expressed as $Fe_2O_3$, and 1 to 10% by weight of alumina, expressed as $Al_2O_3$, the balance, if any, being other non-reducible oxides.

3. A method of making a precursor according to claim 1 comprising calcining a hydrated iron oxide composition in which the hydrated iron oxide has an O/Fe atomic ratio in the range 1.2 to 1.4, and pelleting said calcined composition.

4. A method of making a precursor according to claim 1 comprising de-oxidising an iron oxide composition in which the iron oxide has an O/Fe atomic ratio outside the range 1.2 to 1.4 until said iron oxide has an O/Fe atomic ratio within the range 1.2 to 1.4, and pelleting said de-oxidised composition.

5. A method according to claim 4 wherein the de-oxidation is effected by heating said iron oxide composition in the presence of an oxidant gas and a reducing gas.

6. A method according to claim 5 wherein said de-oxidation is effected by heating said iron oxide composition in the presence of a mixture of steam and hydrogen.

7. A method according to claim 5 wherein said de-oxidation is effected by heating said iron oxide composition in the presence of a mixture of carbon dioxide and carbon monoxide.

8. A method according to claim 5 wherein said de-oxidation is effected by heating said iron oxide composition in the presence of a mixture of steam, hydrogen, carbon dioxide and carbon monoxide.

9. A method according to claim 4 wherein the de-oxidation is effected at temperatures in the range 25°–500° C.

10. A method according to claim 4 wherein the iron oxide composition in which the O/Fe atomic ratio is outside the range 1.2 to 1.4 is made by calcining a hydrated iron oxide composition.

11. A method according to claim 10 wherein the hydrated iron oxide composition is made by precipitation from an aqueous solution of an iron salt.

12. A method according to claim 11 wherein the hydrated iron oxide composition contains hydrated alumina and is made by co-precipitation of the hydrated iron oxide and alumina from an aqueous solution containing an aluminium salt and an iron salt.

13. A catalyst comprising a reduced precursor according to claim 1.

* * * * *